tion of a preferred form of the invention, illustrated with reference to the accompanying drawings, wherein:

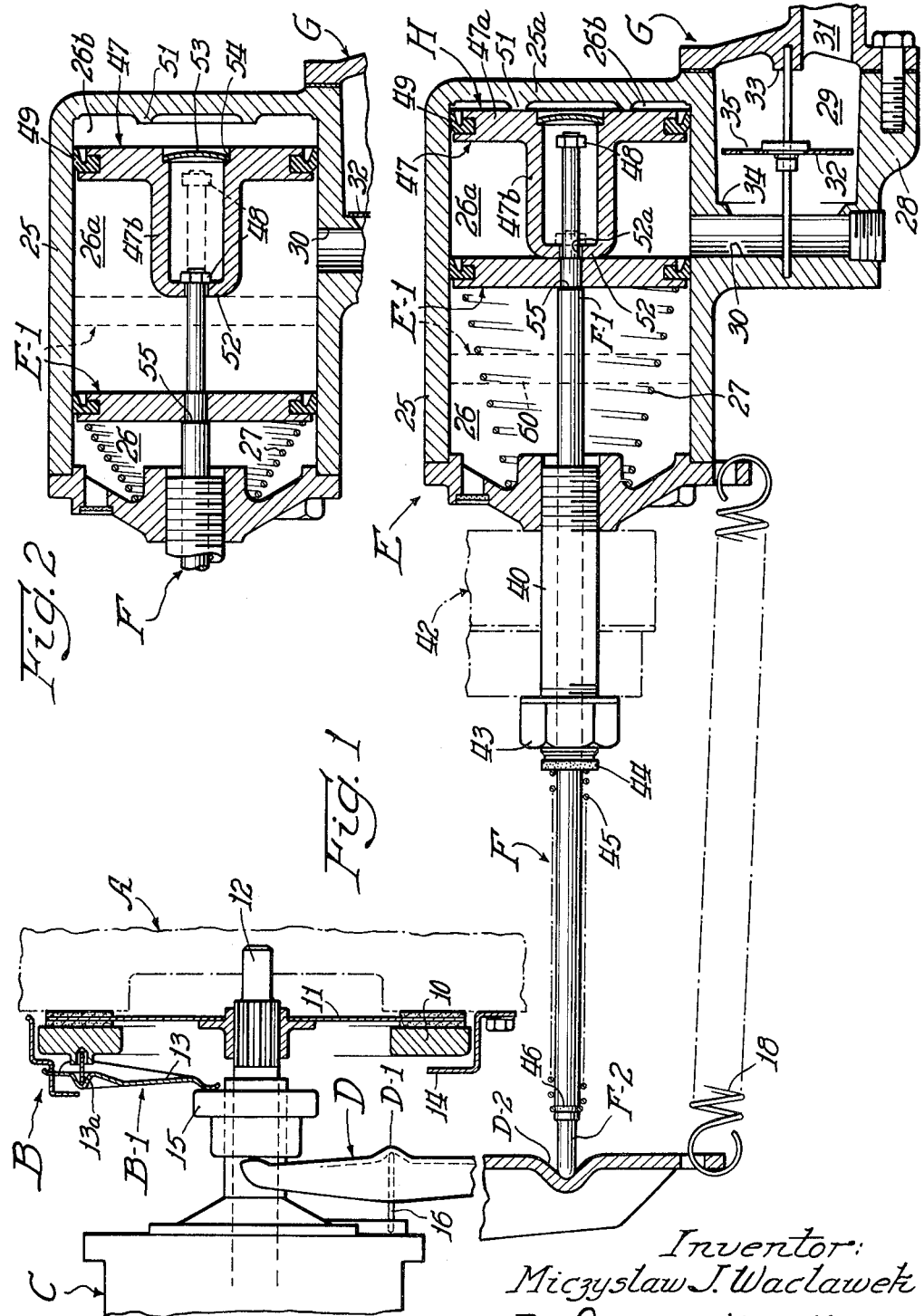

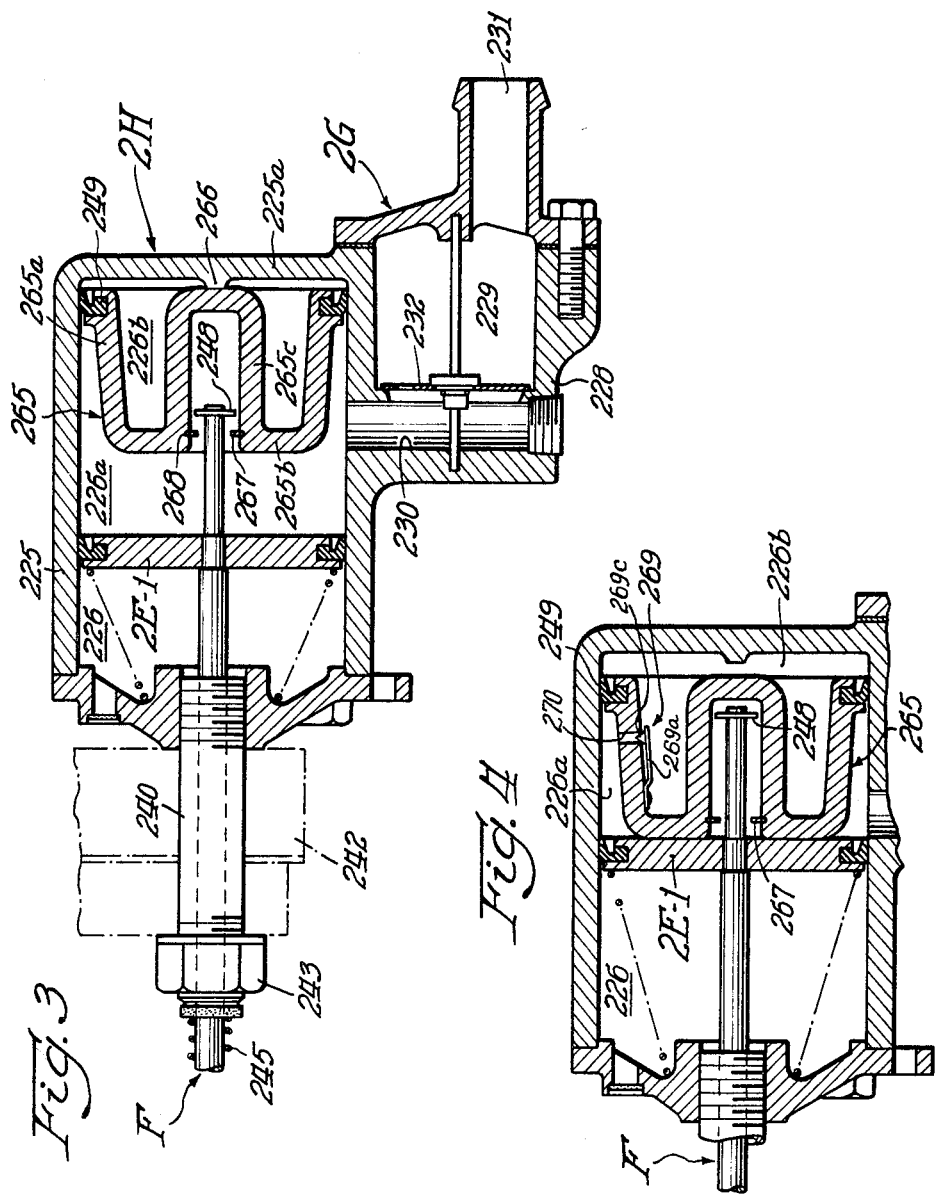

United States Patent Office 3,171,526
Patented Mar. 2, 1965

3,171,526
HYDRAULIC CLUTCH ACTUATOR WITH AUTOMATIC ADJUSTING MEANS
Miczyslaw J. Waclawek, Olympia Fields, Ill., assignor to Borg-Warner Corporation, Chicago, Ill., a corporation of Illinois
Filed Dec. 10, 1962, Ser. No. 243,222
5 Claims. (Cl. 192—111)

This invention relates to friction devices and more particularly to the provision of wear compensating means of the type which are adapted to be engaged by a positive external hydraulic force applied through suitable linkage.

Heretofore, friction devices, and particularly those of the the flat disc clutch type commonly employed in automobiles, have incorporated a variety of wear compensating means to insure that a predetermined engaging force would continuously provide full clutch engagement throughout its operating life. However, not until the recent advent of automatic clutch mechanisms which are adapted to be actuated by an external hydraulic actuator applied through suitable linkage, has great interest been directed to the problem of wear compensation for devices which utilize a predetermined piston stroke to achieve full clutch engagement.

The broad features of this invention contemplate the provision of a wear compensating device having exceptional simplicity and economy and which may be easily internally employed within a hydraulic actuator of present clutch constructions. A particular feature is the use of an auxiliary piston within a conventional servomotor chamber adapted to be advanced mechanically upon the occurrence of wear and thereafter adapted to maintain its advanced position by the use of differential pressures acting within the servomotor chamber whereby the return stroke position of the working piston may correspondingly be adjusted.

Therefore, a primary object of this invention is to provide an improved clutch device of the above type which is adapted to be engaged by an external hydraulic force through suitable linkage and which incorporates improved wear adjusting means.

Another object of this invention is to provide a novel wear adjusting means for a friction device particularly characterized by having an infinite variation in adjusted positions according to the wear that occurs between friction elements of the device.

Still another object of this invention is to provide a wear compensating means for a clutch device of the above type which is adapted to cooperate with predetermined volume modulation of the servomotor operation.

A more particular object of this invention is to provide a hydraulic actuator for a friction device employing means adapted to compensate for wear between friction surfaces of said device, said wear compensating means being particularly characterized by a hollow housing having a pair of pistons slidable therein while in sealing relationship with said housing and adapted to define a working chamber therebetween even while interengaged, at least one of said pistons having a forward and return stroke movement; fluid inlet means for the housing communicating with said working chamber; a thrust member slidably mounting said pistons and carrying stop means limiting the distance said pistons may be moved apart by fluid pressure; and one-way valve means adapted to permit fluid to pass from said working chamber to the other side of the other of said pistons for limiting the return stroke whereby the succeeding forward strokes of said one piston compensates for excessive change in the preceding forward stroke.

This invention consists of the novel constructions, arrangements, and devices to be hereinafter described and claimed in carrying out the above-stated objects and such other objects as will be apparent in the following description of a preferred form of the invention, illustrated with reference to the accompanying drawings, wherein:

FIGURE 1 is in part a schematic layout indicating one type of clutch arrangement of which my invention is particularly adapted to form a part and is also in part a central sectional view of the actuating mechanism; an alternative position of the piston is illustrated in broken outline;

FIGURE 2 is a fragmentary view like that of FIGURE 1 illustrating other operative positions of elements of the device; and FIGURES 3 and 4 are views respectively similar to those of FIGURES 1 and 2 and illustrate another embodiment of this invention.

Referring in greater detail to the figures of the drawings and first to FIGURE 1, there is illustrated schematically a preferred automatic clutch transmission system of which my invention is particularly adapted to form a component part. The features of this invention are of particular significance in the automatic clutch device of the type disclosed in U.S. patent application Serial No. 128,916 (assigned to the assignee of this invention), the disclosure of which is incorporated herein by reference.

In an automatic clutch system of the latter type, the engaging force is generated externally by an hydraulic servomotor and applied by suitable mechanical linkage to achieve full clutch engagement. This type of clutch should be distinguished from ones incorporating spring means which normally urge the friction elements into engagement and which spring means must be overcome to effect disengagement of the clutch problems of wear compensation are different. Also to be distinguished are clutches of the overcenter type and direct non-feathering engaging hydraulic clutches which present wear compensation problems apart from the disclosure herein.

For purposes of convenience, the type of clutch disclosed in applicant's Serial No. 128,916 shall be referred to herein as "springless." As in FIGURE 1, the springless type clutch transmission system broadly comprises the following elements: a driving member A formed as a flywheel which is driven by an engine (not shown) and adapted to selectively transmit rotative power by means of a clutch B to a change-speed transmission mechanism C; operation of the clutch device B is provided by actuation of an operating member or throw arm D which is adapted to apply force to a lever system B-1 of the clutch device. The operating member D is moved for clutch engagement by a hydraulic servo-motor E having a piston E-1 interconnected with the operating member D by way of a thrust member F; the servomotor is of the volume modulated type having hydraulic fluid metered to it by an accumulator valve means G which in turn receives pressurized fluid from a source (not shown) responsive to engine speed as disclosed in the reference application. A wear compensating means H is mounted about the thrust member F adapted to cooperate therewith to adjust the stroke of the thrust member.

The clutch device D, briefly, comprises an annular pressure plate 10 adapted to cooperate with said flywheel A to clamp a driven disc 11 therebetween for imparting drive to a driven shaft 12 on which the driven disc 11 is splined. The pressure plate 10 is urged toward a clutch engaging position by a plurality of levers 13 having an outer end fulcrumed upon a cover plate 14 secured to the flywheel A and having an intermediate portion interconnected by a strut 13a to the pressure plate 10; an inner end of each lever is adapted to be actuated by a thrust collar 15 suitably mounted on the driven shaft 12 for reciprocal movement. The pressure plate 10 is adapted to be retracted from the driven disc 11 by retraction springs or other means (not shown).

The operating member D is adapted to act as a lever in imparting axial thrust to the thrust collar 15. The operating member D has an intermediate portion D–1 pivoted upon a strut 16 which in turn is in engagement with a portion of the transmission C; an inner end of the operating member D engages the collar 15 and an outer end carries a recessed seat D–2 adapted to journal the end of the thrust member F. The operating member D is adapted to be maintained in light operative engagement with the thrust member partly by means of a coiled tension spring 18 urging the outer end of the operating member D to the right (as shown in FIGURE 1). The tension spring has opposite ends respectively interconnecting the operating member D and a stationary fixture, such as the servomotor E.

The servomotor E comprises a housing 25 with a cylindrical servomotor chamber 26 slidably receiving said piston E–1 in sealing relationship. The thrust member F is fastened to a central portion of the piston E–1 and is adapted to be reciprocated upon actuation of the piston. A conically-shaped, coiled compression spring 27 acts between the housing 25 and the left face (see FIGURE 1) of the piston E–1 for urging the piston to a starting position (the starting position would be to the extreme right as shown in FIGURE 1).

The servomotor housing 25 is provided with a cylindrical extension 28 having an accumulating chamber 29 formed therein. An opening 30 provided in the housing 25 is adapted to communicate the accumulating chamber 29 and the servomotor chamber 26; a fluid inlet 31 is provided in the extension 28 which is in communication with a suitable fluid source and preferably one which is responsive to engine speed as disclosed in application Serial No. 128,916.

The servomotor E is adapted for volume modulation in the sense that a specific quantity of fluid is adapted to be initially introduced into the chamber 26 for actuating the piston. In order to provide such volume modulation, an accumulator valve 32 is adapted to be operably mounted within the chamber 29 having an outer periphery smaller than the internal diameter of the chamber 29. The valve 32 is adapted to be moved between a first position wherein it is stationed in abutment with a boss 33 at the extreme right of the chamber 29 and an opposite position wherein its outer periphery engages an annular shoulder 34 at the left end of the chamber 29. Therefore, it can be readily seen that in the extreme right position fluid is permitted to flow around the valve until such time as the valve is urged against the shoulder 34 and thereafter fluid is permitted to flow into the servomotor chamber 26 through a small port 35 provided in the valve 32. As a result, initial soft clutch engagement is provided by a specific volume of fluid which is introduced during the interval of the valve travel between its right-hand position and its left-hand position (as shown in FIGURE 1).

The thrust member F is of unitary construction and has one end F–1 extending through a central portion of the piston E–1 and has an opposite end F–2 adapted to engage with the operating lever as described. The thrust member F extends through a tube 40 which is mounted in aligned openings 41 provided in the servomotor housing 25 and through peripheral portions of the clutch housing 42. The tube 40 is secured in said openings by a fastener 43 received on an end thereof. To seal between the thrust member F and the tube, a seal element 44 is provided snugly fitting on the thrust member F and abutting the end of the tube; the seal is urged to a tight relationship therewith by a coiled compression spring 45 surrounding said thrust member and having one end bearing against the seal element and an opposite end received in a groove 46 provided in the thrust member.

Turning now more specifically to the wear compensating means H, it briefly comprises an auxiliary piston 47 disposed within said servomotor chamber 26 and is adapted to have a lost motion connection with the working piston E–1 provided by a slidable mount on the member F limited by stop 48. The auxiliary piston has a cylindrical portion 47a similar to the portion of the working piston adapted to be received in sliding sealing engagement with the interior of the servomotor housing; an annular sealing ring 49 is received in an annular groove provided in the outer periphery of the portion 47a and effectively provides a one-way valve means for fluid to pass from the left to the right of the portion 47a (as shown in FIGURE 1). The auxiliary piston is positioned in chamber 26 on the working side thereof (to the right of the working piston as shown in FIGURE 1) and cooperates to form a working chamber 26a in conjunction with the working piston E–1 in the housing thereof and an auxiliary chamber or second chamber 26b solely between the auxiliary piston and the end 25a of the servomotor housing. The minimum volume of chamber 26b is defined by a cylindrical extension 51 formed on housing end 25a and is adapted to extend inwardly thereof so that a side of auxiliary piston 47 may abut thereagainst.

The auxiliary piston also has a cylindrical extension 47b with a hollow interior opening through the central part of portion 47a. The outer end of the extension is provided with a radially inwardly extending flange 52 having a central opening 52a adapted to slidably receive the thrust member therethrough. The chamber 26b is sealed against communication with the working chamber 26a through the interior of the extension 47b by a diaphragm 53 resiliently inserted within an annular recess 54 formed on the side of portion 47a.

The lost motion connection between the auxiliary and working pistons 47 and E–1 is provided by a reduced end of thrust member F extending through both said pistons and utilizing the shoulder 55 on member F and stop 48 to limit relative axial movement between the pistons when apart by pressure in chamber 26a. The working chamber 26a is adapted to be in fluid communication with inlet 31 throughout all positions of the working and auxiliary pistons.

*Operation*

In the initial assembled position of the device and before wear has occurred, the auxiliary piston 47 is adapted to be stationed in the position as shown in FIGURE 1 having an abutting relationship with the annular shoulder 51 at the right end of the servomotor housing 25. The working piston E–1 is adapted in the initial stage to abut the end of the auxiliary piston extension 47b as urged by the spring 27. Upon introduction of a predetermined volume of fluid into the working chamber 26a by way of inlet 30 leading from the accumulator value assembly, the working piston E–1 will be urged to the left overcoming the effect of the spring 27 to some position as indicated in broken outline 60. Thrust member F will be moved to the left by contact of the piston E–1 against shoulder 55; the piston 47 will remain in the initial position until the member F has moved to the left a distance which engages stop 48 with the extension 47b indicating wear.

As wear occurs, the auxiliary piston is incrementally adjusted to the left within the housing. Before and during such adjusting, fluid pressure that is introduced into the working chamber 26a will also be communicated to the auxiliary chamber 26b by seepage past the sealing ring 49 which permits fluid to pass in that direction when the pressure differential is such that the pressure in the working chamber is greater. Therefore, during the forward thrust of the thrust member F, pressures in both the working and auxiliary chambers will be substantially equalized. Upon dissipation of the fluid pressure in the working chamber 26a, the spring 27 will urge the working piston E-1 back toward its original position but will be prevented from returning to its original position by the auxiliary piston extension which has now assumed a new position such as that shown in FIGURE 2; accordingly, the return position of piston E-1 will now be that as advanced and shown in broken outline in FIGURE 2. The auxiliary piston 47 will remain in its new position since higher pressure will be trapped in the auxiliary chamber 26b even though pressure is dissipated in the working chamber 26a.

When the working piston E-1 is brought back to the adjusted starting position in engagement with extension 47b, the spring 27 will have an influence to slightly urge the auxiliary piston 47 to the right to the extent that the fluid within the auxiliary chamber may be compressed; such movement will be almost insignificant. However, the movement due to the compressibility of the fluid will be compensated when high-pressure fluid is again introduced into the working chamber 26a overcoming the effect of the spring 27 and relieving the force against the auxiliary piston permitting it to move slightly to the left as the high-pressure fluid in the auxiliary chamber 26b expands.

*Alternative embodiment*

In FIGURES 3 and 4 is illustrated another embodiment incorporating the principles of this invention; parts similar to that of the preferred embodiment are identified by the same reference but prefixed by "2." This embodiment differs in that auxiliary piston 265 is cup shaped having a conical portion 265a with an annular seal 249 received in a groove in the terminal lip of the portion thereof and a cup bottom 265b. An integral, cylindrical extension 265c extends centrally through the portion 265a having one end opening through the bottom 265b and an opposite end which is closed and adapted to engage a protuberance 266 when the piston is moved to the farthest right position (FIGURE 3).

The piston configuration changes the volume content of chambers 276a and 276b so that less fill is required of chamber 276a to move piston 2E-1. The operation of this embodiment is substantially the same as that in connection with the preferred embodiment; the auxiliary piston 265 will be moved to incremental adjusted positions (like that in FIGURE 4) when the thrust member F is moved to the left a distance so that stop 248 engages snap ring 267 received in groove 268 in the interior surface of extension 265c to urge it with the thrust member.

A temperature responsive means 269 may be employed to act as a one-way valve between chambers 226a and 226b (shown in FIGURE 4), said temperature responsive means comprising a bi-metallic resilient strip of metal 269a having one end mounted to the interior side of the piston 265 and an opposite end provided with a closure 269c effective to close off a port 270 provided through the wall of the piston 265. Such temperature responsive means operates in the conventional manner in that as the temperature of the fluid decreases viscosity increases and as such valve will open up said port. However, as the temperature of the actuating medium or fluid reaches its operating temperature, such temperature responsive means acts as a one-way spring valve in that the force of higher pressure will be able to pass through the port to the opposite side of the piston 265 in much the same manner as passing by the seal 249.

While this invention has been described in connection with certain specific embodiments thereof, it is to be understood that this is by way of illustration and not by way of limitations; and the scope of this invention is defined solely by the appended claims which should be construed as broadly as the prior art will permit.

I claim:

1. A hydraulic actuator comprising: means defining a hollow housing and a pair of pistons slidable therein while in sealing relationship with said housing and adapted to define a working chamber therebetween even while interengaged, at least one of said pistons having a forward and return stroke movement; fluid inlet means for said housing communicating with said working chamber; a thrust member slidably mounting said pistons and carrying stop means limiting the distance said pistons may be moved apart by fluid pressure; and one-way valve means adapted to permit fluid to pass from said working chamber to the other side of the other of said pistons for limiting the return stroke whereby the succeeding forward strokes of said one piston compensates for excessive change in the preceding forward stroke.

2. A clutch actuating mechanism comprising: a servomotor actuating device comprising fluid actuated piston means adapted for reciprocal movement and having a thrust stroke in order to provide clutch engagement, a fluid source adapted for providing pressurized fluid in order to actuate said piston means therein; and adjustment means defining in cooperation with said piston means at least one chamber therebetween always in communication with said fluid source, said adjustment means further comprising portions thereof adapted to be engaged by said piston means, and one-way fluid means communicating said chamber with the opposite side of said adjustment means so that fluid may be trapped by passing only in the direction from said chamber to the other side of said adjustment means, said piston means being adapted to move said adjustment means a proportional distance in response to varying thrust strokes of said piston during operation of said mechanism and whereby upon removal of said pressurized fluid in said chamber, said adjustment means will retain its assumed position as urged by the trapped fluid until acted upon by said piston means during the thrust stroke.

3. A clutch actuating mechanism as in claim 2, in which said servomotor means includes a housing having a cylindrical cavity therein, and said piston means including a thrust member extending into said housing and having a piston mounted thereon adapted for sliding movement within said cavity, and said adjustment means also being slidably mounted on said thrust member comprising a generally flat annular element having its periphery in sliding sealing engagement with the walls of said cavity and having a cylindrical extension for engaging said piston, said thrust member carrying stop means adapted to permit said piston and adjustment means to be moved apart by fluid pressure a predetermined, limited distance.

4. In an operating mechanism for a friction device having interengaging friction elements, the combination comprising: a reciprocal thrust member operably connected to said friction device for actuating interengagement of said friction elements, said thrust member being adapted to sense wear that may occur between said elements by a change in the travel of the member to achieve full interengagement, a hydraulic servomotor including a housing and a pair of pistons therein and adapted for sliding movement while in sealing engagement wtih the housing, said pistons defining a first chamber in cooperation with said housing, a first one of said pistons being connected to said thrust member and a second one of said pistons having a lost motion connection with said first piston, said second piston defining a second chamber in cooperation with said housing, means for selectively introducing pressurized fluid into said first chamber so as to react against said second piston and hydraulically urge said first piston for providing interengagement of said friction elements, one-way valve means providing for fluid transfer from said first chamber to said second chamber when the pressure in said first chamber exceeds that of said second chamber, said lost motion connection between said first and second pistons being calibrated to positively advance the second piston when wear begins to occur between said friction elements and whereby fluid trapped in said second chamber will retain said second piston in the advanced position upon a dissipation of fluid pressure in said first chamber.

5. The combination as in claim 1, in which said lost motion connection comprises an extension on said first piston carrying a stop member and a shoulder on said second piston adapted to engage said stop member on said extension when the travel of said first piston exceeds the normal predetermined movement for providing full interengagement of said friction elements before wear occurs.

References Cited in the file of this patent
FOREIGN PATENTS
648,027    Germany _____ July 20, 1937

OTHER REFERENCES
German printed application 1,059,302, June 11, 1959.